Figure 1:
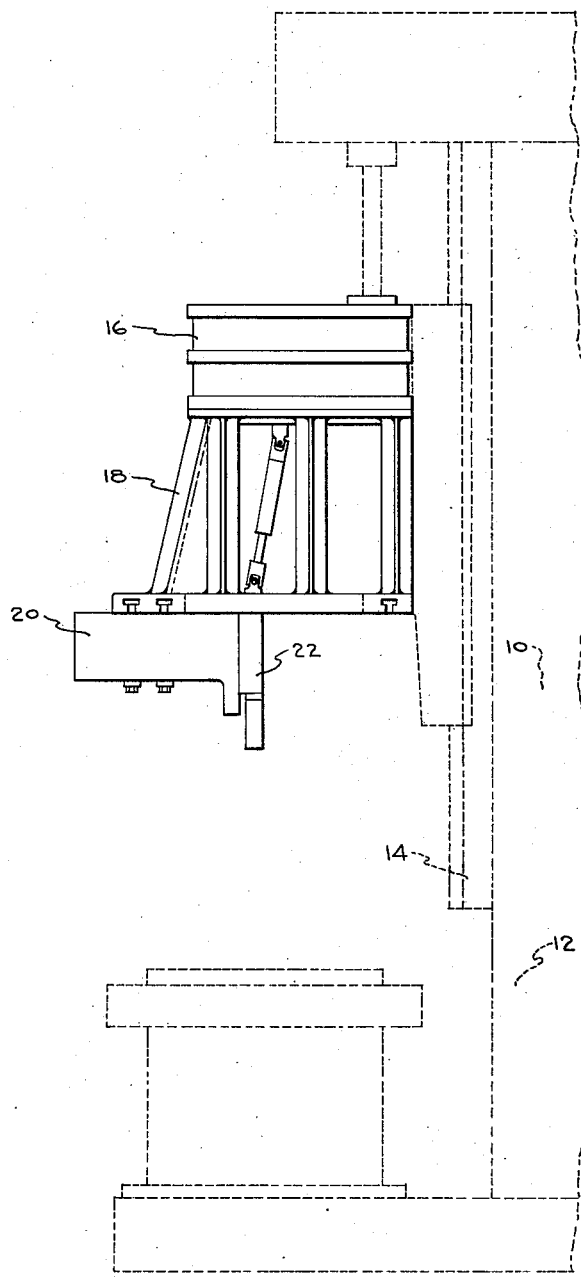

Oct. 22, 1940.  H. W. FOX ET AL  2,218,984

MACHINE TOOL CONSTRUCTION

Filed May 5, 1938  3 Sheets-Sheet 1

Inventors
HOWARD D. CORWIN, AND
HIRAM W. FOX

By Beaman & Langford
Attorney

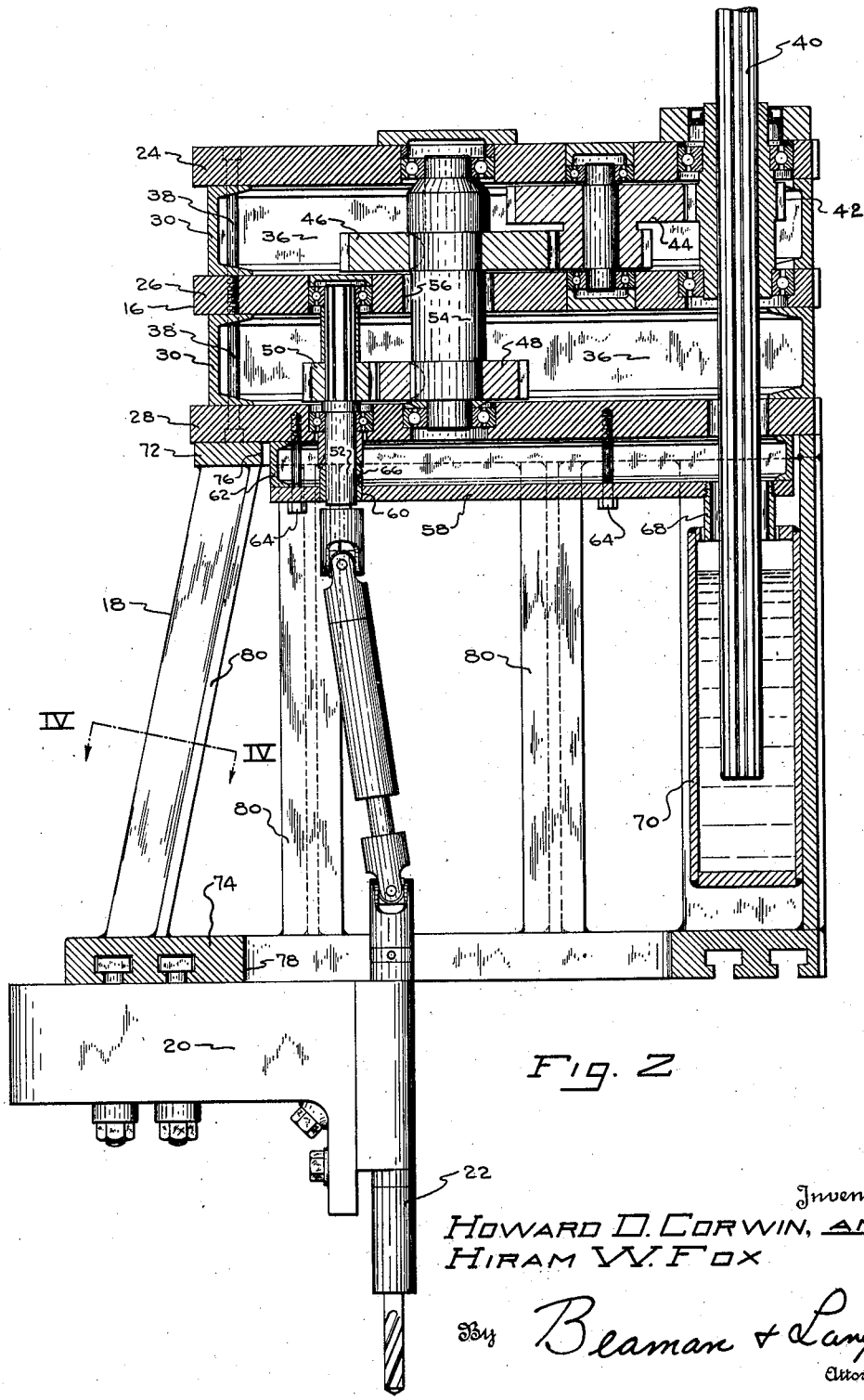

Oct. 22, 1940.  H. W. FOX ET AL  2,218,984
MACHINE TOOL CONSTRUCTION
Filed May 5, 1938  3 Sheets-Sheet 3

Inventors
HOWARD D. CORWIN, AND
HIRAM W. FOX
By Beaman & Langford
Attorney

Patented Oct. 22, 1940

2,218,984

UNITED STATES PATENT OFFICE 2,218,984

MACHINE TOOL CONSTRUCTION

Hiram W. Fox and Howard D. Corwin, Jackson, Mich.

Application May 5, 1938, Serial No. 206,158

1 Claim. (Cl. 77—5)

The present invention relates to improvements in the construction of tool heads for machine tools.

In the past it has been the practice in the manufacture of machine tool heads and associated structure to use cast metal construction. This practice involves the expense of patterns, which must be changed with every change in shape and size of the fabricated part. The result has been that a great part of the expense involved in building machine tools has been chargeable to pattern cost and storage. This has been particularly true with respect to the tool heads of multiple spindle drilling and tapping machine tools, which are mostly custom built and purchased in relatively few numbers of any one design.

It is the object of the present invention to eliminate or greatly reduce cast metal parts, together with the accompanying pattern cost, in the fabrication of tool heads and tool head skirts of machine tools. This has been accomplished through the use of standard rolled sheets, bar stock and flat castings which permits great flexibility in design and change of construction, shape and size without being confronted with excessive pattern costs. Sheets and bars of standard gauge and shapes are conveniently stocked by the manufacturer from which the tool heads and head skirts may be fabricated, meeting customers' varied specifications with substantial reduction in manufacture cost over prior practices.

Figure 3:
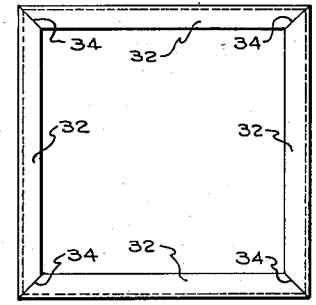
Figure 4:
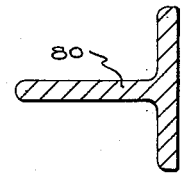
Figure 5:
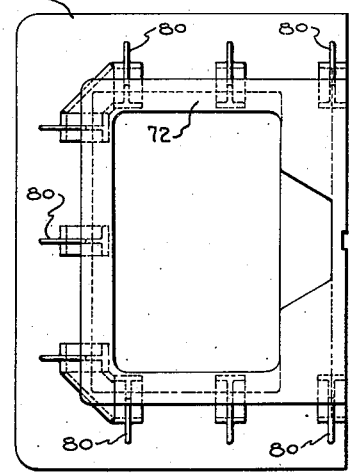
Figure 6:
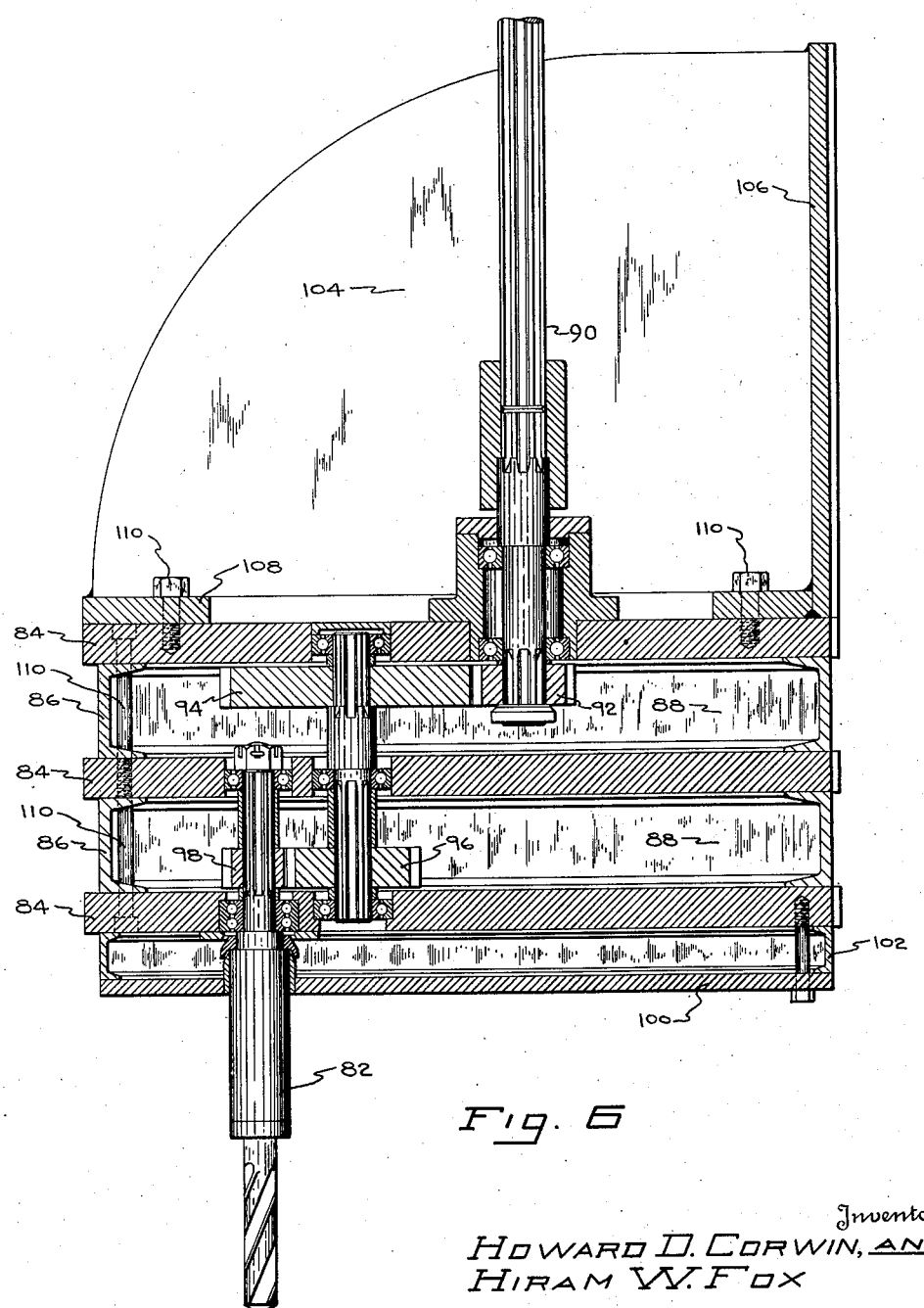

In the drawings,

Fig. 1 is a side elevational view of a machine tool head embodying the present invention, Fig. 2 is a vertical cross-sectional view of the tool head shown in Fig. 1, Fig. 3 is a plan view of a box section used in the construction of the tool head, Fig. 4 is a cross-sectional view of the skirt column construction taken on line IV—IV of Fig. 2, Fig. 5 is a plan view of the head skirt shown in Fig. 2, and Fig. 6 is a view similar to Fig. 2 of a fixed center head embodying the principles of construction of the invention.

Referring to Fig. 1, the principles of the present invention are illustrated in connection with a multiple spindle drilling machine 10 having a column 12 carrying ways 14 upon which the tool head 16 is supported for vertical movement in a well known manner. A skirt 18 furnishes support for the adjustable bracket 20 carrying the adjustable tool spindle 22. The bracket and tool spindle may be of conventional construction.

As more clearly shown in Figs. 2, 3 and 4, the head 16 is fabricated from either sheet metal or flat cast iron plates 24, 26 and 28 spaced by similar frames 30 fabricated from standard rolled bar sections. In the illustrated form, a channel section has been selected, which is cut into side portions 32 with chamfered ends which are welded together at 34 to form a rigid box section. The spacing of the plates by the frames 30 defines gear chests 36. Suitable tie bolts 38 hold the parts assembled and permit ready disassembly for repair and inspection.

For clarity, only the gear train and shafting for a single tool spindle 22 has been illustrated. The usual spline drive shaft 40 drives the gear 42, which in turn drives the gears 44, 46, 48 and 50. The universal joints and shafting for driving the spindle 22 from the shaft 52 driven by the gear 50 is of well known construction. The plates 24, 26 and 28 are suitably machined to receive the bearings for the gear shafting and to enable a shaft to extend from one gear chest to another, as in the case of the shaft 54 which extends through the opening 56 in the plate 26.

Preferably, the skirt 18 is free from all structures associated with the driving of the spindles 22. To this end, the structure through which the shafts 52 extend takes the form of a plate 58 having as many openings 60 therein as there may be spindles 22. A box section 62, corresponding in construction to the box section of Fig. 3, spaces the plate 58 from the under side of the plate 28. Stud bolts 64 hold the parts in assembly. Suitable bushings 66 prevent the passage of oil, which drains into the oil pan defined by the plates 58, and a box section 62, from which the oil is discharged through a neck 68 into the reservoir 70 carried by the skirt 18.

The skirt 18, in accordance with the principles of construction of the present invention, is entirely fabricated from welded plates and bars. As shown in Figs. 2 and 5, the skirt 18, comprising upper and lower rolled sheet metal plates 72 and 74, has central openings 76 and 78 cut therein. In practice, these openings may be cut economically through the use of a cutting torch. Spacing the plates 76 and 78 are columns 80 cut from standard rolled bar stock. As shown in Fig. 4, a bar of T-section has been used. Many other standard sections may be used with equal satisfaction. The columns 80 are welded at their tops and bottoms to the plates 72 and 74.

It should be readily apparent from the foregoing description that the size of the head 16 may be shaped by cutting the plates 24, 26 and 28 smaller or larger and varying the length of the side portions 32 accordingly. With the same size plate, the depth of each gear chest 36 may be changed through the sections of a standard bar stock of desired width. Similar flexibility of construction is present in the fabrication of the skirt 18.

In Fig. 6, the principles of construction of the head 16 are shown applied to a fixed center head in which the spindles 82, of which only one is illustrated, are not adjustable. In this type of head there is no need for the skirt 18 of Fig. 2, as should be obvious. As in the head construction of Fig. 2, plates 84 spaced by box sections 86 of welded standard bar section define gear chests 88. The main driving shaft 90 is splined in the driving gear (not shown) and moves with the head in a well known manner. The spindles 82 are driven through a gear train 92, 94, 96 and 98. A bottom plate 100 and box section 102 of welded standard bar section define an oil pan. The supporting bracket portion of the head illustrated takes the form of side plates 104, a back plate 106 and a bottom plate 108, all welded together. Suitable bolts 110 removably hold the above described parts in assembled relation. The same flexibility of design, permitting changes in size and shape, is present in the head construction of Fig. 6 to the same extent discussed with reference to the head 16 of Fig. 2.

The standard rolled sections from which the box section of Fig. 3 and the box section 86 of Fig. 6 are fabricated may take various forms. For example, an I-section could be used. The channel section has been preferred, however, as it gives a finished outside appearance when fabricated into a box section. It is also within the scope of the present invention to fabricate the box section 86, for example, from flat upright sections of rolled sheet stock. Such a box section, however, does not possess the rigidity of a box section built up from flanged bar sections.

Having thus described our invention, what we claim and desire to protect by Letters Patent is:

In an adjustable multiple spindle tool head, a head skirt comprising a pair of separately fabricated parallel flat ring shaped plates located one above the other and of graduated size, rolled bar sections of angular cross-section providing stiffening ribs in two different directions spacing said plates in abutting relation with the lower surface of the upper plate and the upper surface of the lower plate, said bar sections being inclined and converging from the lower plate to the upper plate with their ends integrally connected to said plates, the central opening of said plates receiving the flexible connection members for driving the spindles, and means provided in the lower surface of the larger of said plates for adjustably supporting the tool spindle brackets.

HIRAM W. FOX.
HOWARD D. CORWIN.